United States Patent [19]

Goral

[11] Patent Number: 5,078,415

[45] Date of Patent: Jan. 7, 1992

[54] MOBILE CARRIER FOR GAS CYLINDERS

[76] Inventor: Norbert Goral, 24 Calder Crescent, Whitby, Ontario, Canada, L1N 6M3

[21] Appl. No.: 551,229

[22] Filed: Jul. 11, 1990

[51] Int. Cl.⁵ ............................................. B62B 3/04
[52] U.S. Cl. ................................. 240/79.2; 108/55.1
[58] Field of Search ............... 280/47.34, 47.35, 79.11, 280/79.2, 79.3, 79.5, 79.6, 79.7; 108/51.1, 52.1, 55.1, 55.3, 56.1

[56] References Cited

U.S. PATENT DOCUMENTS

| | | | |
|---|---|---|---|
| D. 264,759 | 6/1982 | Schilling et al. | D34/17 |
| 1,865,618 | 7/1932 | Dahlman et al. | 280/79.2 |
| 2,833,550 | 5/1958 | Frick | 280/47.34 |
| 2,955,836 | 10/1960 | Patricia | 280/47.34 |
| 3,602,368 | 8/1971 | Gould | 108/55.1 |
| 4,699,391 | 10/1987 | Syring | 280/79.11 |
| 4,865,339 | 9/1989 | Rundborg et al. | 280/47.21 |

FOREIGN PATENT DOCUMENTS

| | | | |
|---|---|---|---|
| 737353 | 6/1966 | Canada | 280/65 |
| 1016087 | 8/1977 | Canada | 190/13.5 |
| 1174646 | 9/1984 | Canada | 214/113 |

OTHER PUBLICATIONS

R. F. Barnes, Carrier for Tanks, I.B.M. Technical Disclosure Bulletin (vol. 12, No. 4, Sep. 1969).

Zering Mfg. Co., Cincinnati, Ohio, Fig. 365, Copyright 1908.

*Primary Examiner*—Andres Kashnikow
*Assistant Examiner*—Richard Camby
*Attorney, Agent, or Firm*—Rogers, Bereskin & Parr

[57] ABSTRACT

A mobile carrier capable of carrying a number of gas cylinders comprises a generally horizontal first support surface with at least three wheel supports rigidly attached to it, each wheel support including a rotatably mounted wheel. The wheel supports are off-set laterally relative to the first support surface, the first support surface being below the top of at least one wheel support. An upright frame rigidly connected to the first support surface extends around three sides of the carrier. A second support surface is pivotally connected to an outside edge of the first support surface along a fourth open side of the carrier. The second support surface is pivotable between an upright position, where it may be secured to the frame, and a lowered position in which the second support surface is supported on another surface so that a gas cylinder may be moved between the mobile carrier and another surface by rolling the container about its axis between the first support surface and the other support surface along the second support surface.

14 Claims, 2 Drawing Sheets

MOBILE CARRIER FOR GAS CYLINDERS

FIELD OF THE INVENTION

The present invention relates to mobile carriers generally, and in particular relates to mobile carriers capable of carrying a plurality of compressed gas cylinders hereinafter referred to as "gas cylinders".

BACKGROUND OF THE INVENTION

The most common method of transporting a gas cylinder from one location to another is to tilt the cylinder and roll it about its longer axis. There are several disadvantages to moving cylinders in this fashion over considerable distances or up and down steeply inclined surfaces: the physical exertion necessary to complete such a task is considerable; there is a risk of injury; and the cylinder may be damaged if it is dropped with a consequent further risk of injury by escaping gases of toxic or flammable characteristics.

Gas cylinders, even when not completely full, are extremely heavy. As a consequence there is a high rate of back and other injuries amongst welders and other workers using gas cylinders, resulting from attempts to move gas cylinders.

Various non-mechanized transporting devices have been proposed in the past for carrying and moving gas cylinders and other items ranging from dishes to rolls of carpet. Generally, these transporting devices can be divided into two categories, namely, those that have a means to facilitate the loading and unloading of items onto and off of the transporting device and those that lack these means.

Such latter devices typically function as receptacles for a plurality of items which, individually, may be safely lifted off of the ground and placed onto or into the device without much physical exertion. Such devices usually comprise one or more support surfaces for carrying said items, one or more walls or other restraining means attached to the support surfaces to prevent said items from falling out of the transporting device, and wheel arrangements (usually comprising four wheels) directly beneath the support surface to facilitate the movement of the device. Typical known arrangements are shown in Canadian patent 1,016,087 (Nilsson) issued Aug. 23, 1977, Canadian patent 737,353 (Freeman et al) issued June 28, 1966, U.S. Pat. No. 2,955,836 (Patricia) issued Oct. 11, 1960, U.S. Pat. No. 2,833,550 (Frick) issued May 6, 1958 and U.S. design patent U.S. Pat. No. 264,759 (Schilling et al) issued June 1, 1982.

The disadvantage of these prior art devices is that much physical strength is necessary to lift heavier items onto these devices. Furthermore, it would be quite impossible for a person to comfortably lift and load very heavy items onto these devices, such as gas cylinders which usually weigh in the range of 100 kg, without risk of injury.

In one of the typical versions of a transporting device with a means to facilitate the loading and unloading of such heavier items onto and off the device, there is a two-wheeled carrier with an elongated frame having a handle at its upper end and a support plate at the lower end. In use, the cylinder to be transported is tilted forward while the support plate is wedged under the cylinder and a chain may be placed about the cylinder to secure it to the carrier. The carrier and the cylinder are then simultaneously tilted backward and moved about. The loading of such a device is simple, but, due to the weight of the gas cylinder and its high centre of gravity, there is a danger of the carrier and cylinder becoming unstable and tipping over, particularly when they are being moved up or down inclined surfaces, thereby potentially causing injury to the user and/or damage to the carrier.

In another version of a two-wheeled carrier as described above, the problem of loading a gas cylinder from a surface supporting the carrier, such as a shop floor, onto another elevated support surface, such as a flat-bed truck, has been addressed. This arrangement is shown in U.S. Pat. No. 4,865,339 (Rundborg et al) issued Sept. 12, 1989. Such a carrier avoids the dangers of tipping present with a conventional two-wheeled carrier loaded with a gas cylinder when it is being moved up an inclined surface onto another elevated support surface. But, the Rundborg et al-type carrier still suffers from disadvantages. It is generally adapted to carry only one gas cylinder. The cylinder is not left standing upright on the elevated support surface, but rather it is left in a horizontal position and resting on the device which itself rests on said surface. Therefore, such a device is not adapted to place a gas cylinder in its upright position on an elevated support surface, say a welder's cart, which is relatively less elevated than the bed of a truck.

Another version of a device adapted to overcome some of the disadvantages of two-wheeled carriers has a base section with at least three wheels, and has a small platform which is placed beneath the gas cylinder and is displaced slightly off the floor by means of a lever. This arrangement is shown in Canadian patent 1,174,646 (Gordon) issued Sept. 18, 1984. The disadvantage of such a device is that its design is not suited to accommodate a plurality of gas cylinders. As in Rundborg et al, the device is also not adapted to place a gas cylinder in its upright position on another elevated support surface, such as a welder's cart or the bed of a truck, without the need to move the device with the gas cylinder on it up an inclined surface to the elevated support surface.

It is an object of the present invention to provide a device which is capable of carrying a plurality of gas cylinders, which is stable, and which facilitates the placement of gas cylinders in their upright position, but not exclusively, onto another surface.

SUMMARY OF THE PRESENT INVENTION

According to the present invention, there is provided a mobile carrier, capable of carrying a plurality of gas cylinders, which comprises:

a generally horizontal first support surface;

at least three wheel support means rigidly attached to the first support surface, each wheel support means including a rotatably mounted wheel, with the wheel support means being off-set laterally relative to the first support surface and the first support surface being below the top of at least one wheel support means;

an upright frame rigidly connected to the first support surface extending around three sides of the carrier and adapted to restrain gas cylinders carried on the mobile carrier; and a second support surface pivotally connected to an outside edge of the first support surface and adapted to be secured to the frame when in an upright position, the second support surface being pivotable between the upright position and a lowered position in which the second support surface is supported on another surface, whereby a cylindrical shaped container may be moved between the mobile carrier and another surface by rolling said container about its axis between the first support surface and the other support surface along the second support surface.

BRIEF DESCRIPTION OF THE DRAWING FIGURES

Embodiments of the invention will now be described, by way of example only, with reference to the accompanying drawings, wherein:

FIG. 1 is a perspective view of a mobile carrier capable of carrying a plurality of gas cylinders showing one embodiment of the present invention; and FIG. 2 is an elevated side view of the embodiment shown in FIG. 1 with a fragmentary cross-sectional view along the centreline of the lower portion of the mobile carrier.

DESCRIPTION OF PREFERRED EMBODIMENT

Figure 1:
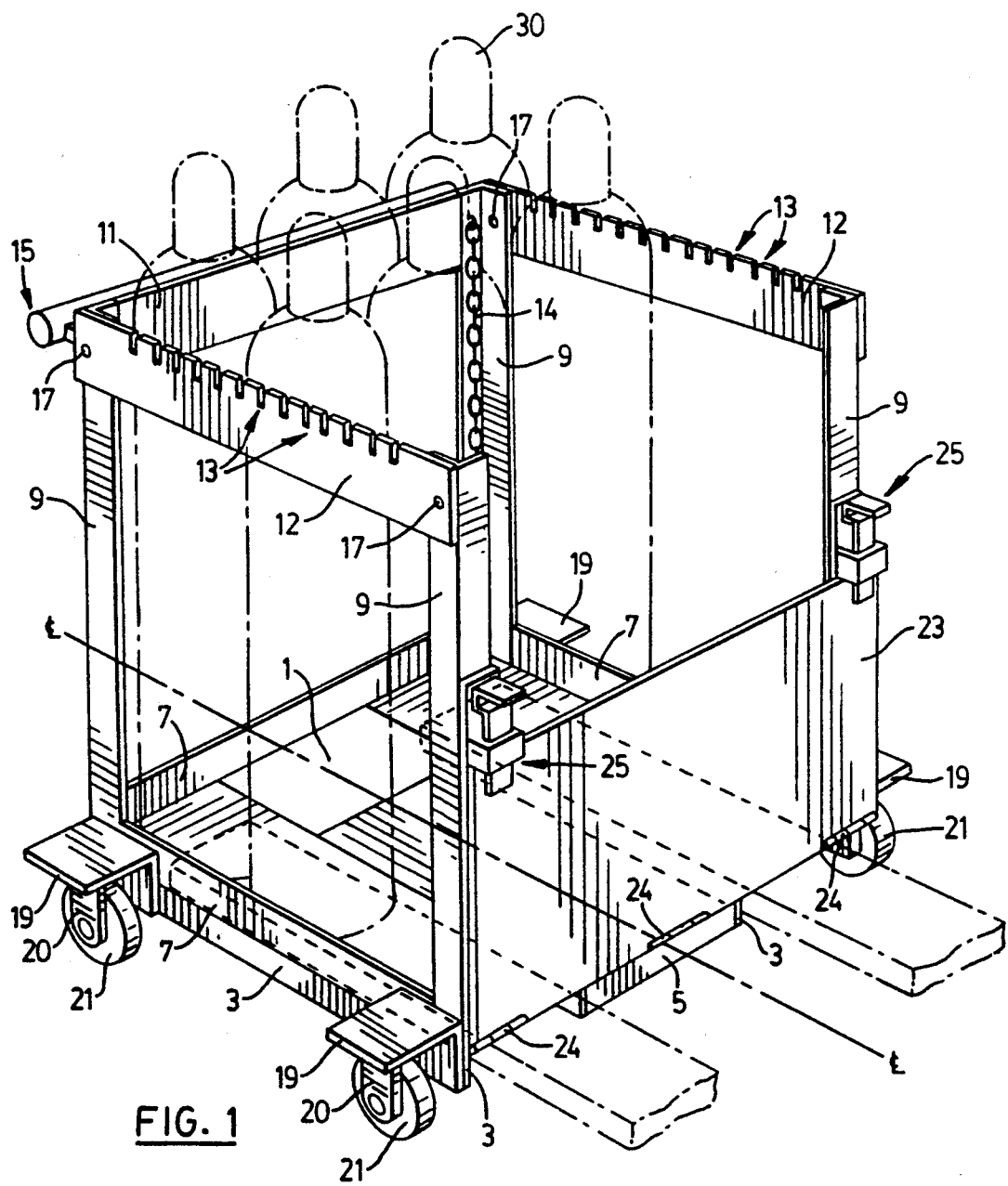
Figure 2:
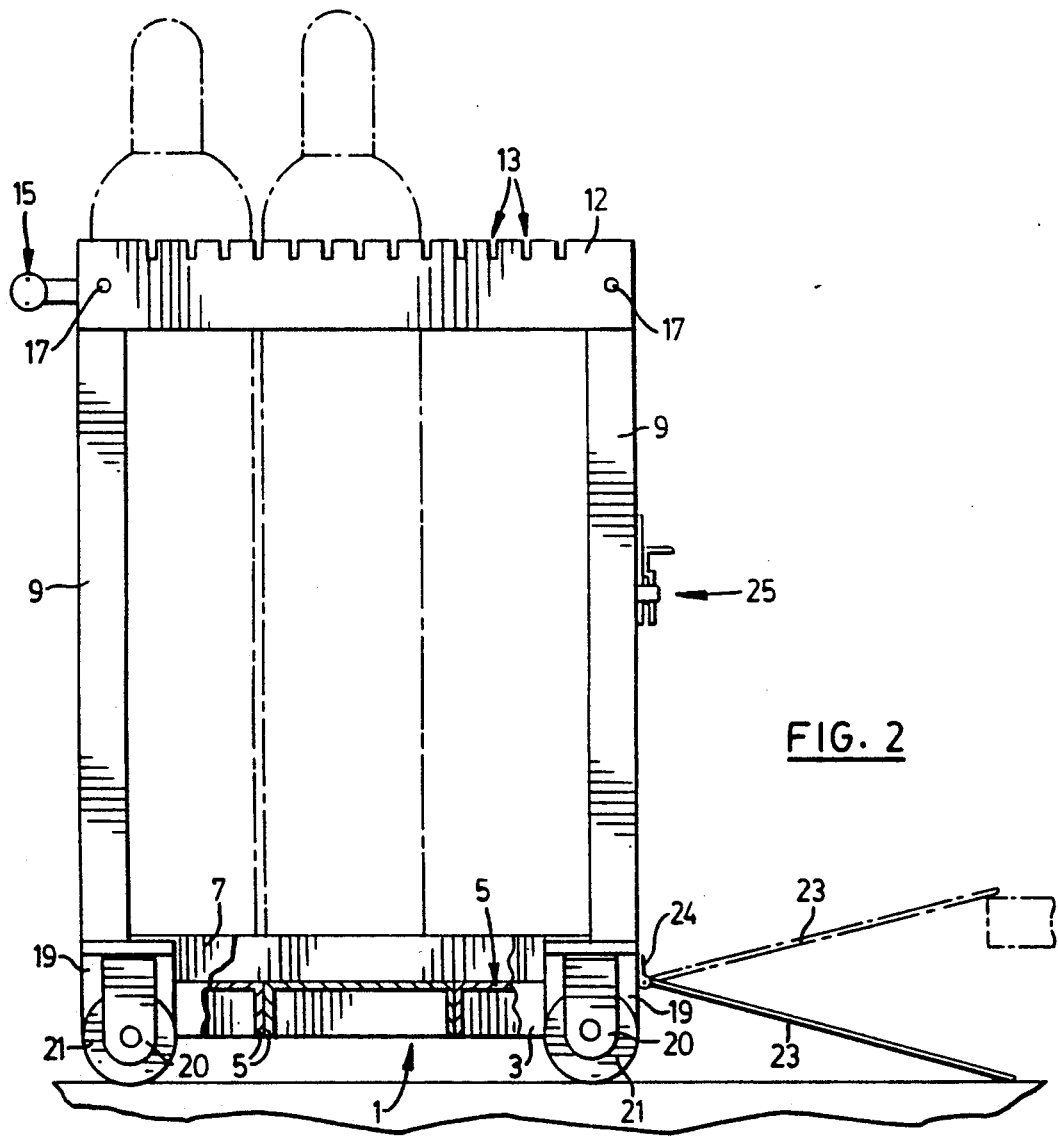

FIGS. 1 and 2 show a mobile carrier capable of carrying a plurality of gas cylinders, indicated in ghost outline at 30, comprising a first support surface 1 on which the gas cylinders 30 may be carried in an upright position. The first support surface 1 is comprised of two longitudinal channel sections 3 oriented parallel to each other, one on either side of the centreline of the first support surface 1, and three transverse channel sections 5 oriented transversely to said centreline and placed between, and fixed to, the longitudinal channel sections 3. The longitudinal channel sections 3 and the transverse channel sections 5 are inverted U-shapes in cross-section, the web elements of said sections 3 and 5 being oriented along a common horizontal plane to form the first support surface 1.

Fixed to the perimeter of the first support surface 1 are vertically oriented rectangular members 7 forming an outer lip for the first support surface 1, adapted to restrain gas cylinders 30 carried on the mobile carrier. In another embodiment of the invention, the rectangular members 7 are integral with the first support surface 1.

At each corner there is a vertically extending section 9 comprising an angle, the lower end of which is rigidly connected to three members, namely, the first support surface 1, the rectangular member 7 and the vertical leg of a wheel support angle bracket 19. The upper ends of the vertically extended members 9 are rigidly connected to a rear top restraining section 11 and to two side top restraining sections 12.

The rear top restraining section 11 is a rectangular-shaped metal bar, butt welded to two of the vertically extended sections 9. The side top restraining sections 12 which run parallel to the centreline of the first support surface 1, each comprises a flat rectangular-shaped metal bar and overlaps the vertically extended sections 9. The sections 12 have a series of rectangular grooves 13 along their upper edges adapted to accept a link of a chain 14. One end of the chain 14 is secured to a vertically extended section 9. The chain 14 can be engaged with the side top restraining sections 12 to secure the gas cylinders 30 from toppling over, particularly during the transportation of the mobile carrier. The chain 14 is shown schematically and would be of a suitable length.

A handle 15 is rigidly connected to the exterior vertical face of the rear top restraining section 11, on either end thereof. The handle 15 is adapted for a person to comfortably push or pull the mobile carrier along a surface supporting the mobile carrier.

A number of holes 17 in the side top restraining sections 12, which, as shown, also protrude through the vertically extending sections 9, allow a hook of a crane to be coupled therewith so that the mobile carrier may be lifted and transported by said crane. It will be appreciated by those skilled in the art that eyes may also be attached to the side or rear top restraining sections 12 and 11 to act as a coupling means for a crane hook.

The mobile carrier of this embodiment may also be lifted using a fork-lift truck. The fork arms of the fork-lift truck may be placed below the first support surface 1 by inserting said fork arms into the two inverted longitudinal channel sections 3. This arrangement prevents the fork arms from slipping transversely away from the first support surface 1, hence reducing the risk of dropping the mobile carrier.

The wheel support angle brackets 19 have their vertical leg rigidly connected to the outside faces of three members in the vicinity of the first support surface 1, namely, the vertically extended section 9, the rectangular member 7 and the flange of the longitudinal channel section 3. Each wheel support angle bracket 19 also has a horizontal leg extending outwardly above the first support surface 1. A wheel bracket 20 is attached to the horizontal leg of each wheel support angle bracket 19. Each wheel bracket 20 has a wheel 21 rotatably mounted therein and resting on a surface supporting the mobile carrier. Each wheel support angle bracket 19 and wheel bracket 20 form a wheel support means that is laterally off-set from the first support surface 1 such that the top of the wheel bracket 20 is above the first support surface 1, and optionally the top of each wheel 21 is above the first support surface 1.

This off-set arrangement allows the first support surface 1 to be closer to the surface or ground supporting the mobile carrier, and gives the mobile carrier a wider wheel base. Thus, the device has greater stability than if the wheel support means were placed beneath the first support surface 1, and this facilitates loading and unloading of gas cylinders 30 as detailed below.

A second support surface 23 is pivotally connected to an outside edge of the first support surface 1 by means of hinges 24. The second support surface 23 can thus be pivoted between an upright position and a lowered position. In its generally upright, or "closed", position, the second support surface 23 restrains the gas cylinders 30 carried on the mobile carrier from slipping off the first support surface 1.

There are locking clasps 25 on each vertically extended section 9 which engage with the second support surface 23 when it is brought to its closed position so as to secure the second support surface 23 to the vertically extended sections 9. Each locking clasp 25 comprises locking members slidably mounted in U-shaped brackets which in turn are welded to plates secured to two of the vertically extended sections 9. When the second support surface 23 is disengaged from the locking clasps 25, it may be brought to a lowered or generally horizontal, "open", position, by placing the free edge—the edge opposite the pivoted edge of the second support surface 23—upon another surface. As shown in FIG. 2, this other surface may be the one on which the mobile carrier rests or any other surface, such as a welder's cart. Therefore, during normal operation, a gas cylinder 30 or any other cylindrical shaped container may be moved between the mobile carrier and another surface by tilting and rolling said container about its longer axis between the first support surface 1 and the other support surface along the second support surface 23.

It is to be appreciated that, in view of the weight on this type of carrier, the overall structure has to be robust. For example, six gas cylinders 30 would give a load of 600 kg. Thus, the carrier is formed of a robust welded construction, with many of the principal elements formed from ¼" thick mild steel. The channels sections 3, 5 could, for example, be formed from an 8" wide channel section, weighing 11.5 lbs. per foot. The wheel support angle brackets 19 may be formed from ½" mild steel. The second support surface 23 may be formed from a ⅜" mild steel sheet. The wheels 21 in this preferred embodiment may be Darnell 4" diameter hard rubber casters (model 31-404-THR) with a load rating of 1000 lb. each.

I claim:

1. A mobile carrier, capable of carrying a plurality of gas cylinders, which comprises:
   a generally horizontal first support surface, including a pair of inverted channel sections forming part of the first support surface and adapted to receive the fork-arms of a forklift truck;
   at least three wheel support means rigidly attached to the first support surface, each wheel support means including a rotatably mounted wheel, with the wheel support means being off-set laterally relative to the first support surface and the first support surface being below the top of at least one wheel support means;
   an upright frame rigidly connected to the first support surface (extending around three sides of the carrier) and adapted to restrain gas cylinders carried on the mobile carrier, said upright frame including vertically extended sections, extending upwardly from corners of the first support surface and top restraining sections on three sides of the carrier extending between upper ends of the vertically extended sections, a fourth side, adjacent to a second support surface, being open; and
   the second support surface pivotally connected to an outside edge of the first support surface, along the fourth open side of the carrier, and adapted to be secured to the frame when in an upright position, the second support surface being pivotable between the upright position and a lowered position in which the second support surface is supported on another surface, whereby a cylindrical shaped container may be moved between the mobile carrier and another surface by rolling said container about its axis between the first support surface and the other support surface along the second support surface.

2. The mobile carrier as claimed in claim 1, which is generally rectangular in plan and includes a wheel support means at each corner thereof, wherein each of a pair of wheel support means located on a transverse axis comprises a wheel support angle bracket secured to the first support surface and a wheel bracket pivotally mounted thereto which is rotatable about a vertical axis and provides a caster action.

3. A mobile carrier as claimed in claim 2, wherein all of the wheel support means comprise a wheel support angle bracket secured to the first support surface and a wheel bracket pivotally mounted thereto which is rotatable about a vertical axis and provides a caster action.

4. The mobile carrier as claimed in claim 2, wherein the other pair of wheel support means comprise a wheel support bracket in which the respective wheel is mounted solely for rotation about a horizontal axis.

5. The mobile carrier as claimed in claim 1, which is generally rectangular in plan and includes an outer lip around three sides of the first support surface, the fourth side being open and being adjacent to the second support surface.

6. The mobile carrier as claimed in claims 5, wherein the wheel support means include wheel support angle brackets having one vertical leg secured to the adjacent first support surface, and a horizontal leg to which is mounted the respective wheel bracket, the horizontal leg being located above the first support surface.

7. The mobile carrier as claimed in claim 5, which includes a pair of locking clasps slidably mounted on the two vertically extended sections defining the fourth open side of the mobile carrier on which locking clasps can be slid vertically to engage and disengage the second support surface when in its upright position.

8. The mobile carrier as claimed in claim 7, wherein two of the top restraining sections comprise side restraining sections facing one another and each includes a row of grooves, receiving a link of a chain, and wherein a chain is secured to a vertically extended section of the upright frame.

9. A mobile carrier as claimed in claim 5, which includes a plurality of additional inverted channel sections extending transversely between the pair of channel sections for receiving the fork-arms.

10. A mobile carrier as claimed in claim 9, wherein at least two of the wheel support means comprise a wheel support angle bracket and a wheel bracket at which the respective wheel is rotatably mounted about a horizontal axis and which is rotatably mounted to the wheel support angle bracket about a vertical axis and provides a caster action.

11. A mobile carrier as claimed in claim 10, wherein all of the wheel support means comprise a wheel support angle bracket and a wheel bracket in which the respective wheel is mounted for rotation about a horizontal axis and which is rotatably mounted to the respective wheel support angle bracket about a vertical axis and provides a caster action.

12. A mobile carrier as claimed in claims 5, 9, or 11, which includes a handle secured to the upright frame adjacent to the top thereof, opposite the second support surface.

13. A mobile carrier as claimed in claims 5, 9, or 11, which includes a plurality of holes at the upper end of the upright frame, to enable the carrier to be lifted by a crane.

14. A mobile carrier as claimed in claim 11, which includes a handle secured to the upright frame near the upper end, thereof, opposite the second support surface and a plurality of holes at the upper end of the upright frame, to enable the mobile carrier to be lifted by a crane.

* * * * *